United States Patent

Nishimura

(10) Patent No.: US 6,707,618 B2
(45) Date of Patent: Mar. 16, 2004

(54) VARIABLE MAGNIFICATION LENS AND CAMERA HAVING THE SAME

(75) Inventor: Kazuya Nishimura, Hachioji (JP)

(73) Assignee: Olympus Corporation, Tokyo (JP)

( * ) Notice: Subject to any disclaimer, the term of this patent is extended or adjusted under 35 U.S.C. 154(b) by 0 days.

(21) Appl. No.: 10/457,441

(22) Filed: Jun. 10, 2003

(65) Prior Publication Data

US 2003/0227692 A1 Dec. 11, 2003

(30) Foreign Application Priority Data

Jun. 11, 2002 (JP) ........................................ 2002-170551
Jul. 19, 2002 (JP) ........................................ 2002-211645

(51) Int. Cl.$^7$ .............................................. G02B 15/14
(52) U.S. Cl. ........................................ 359/692; 359/691
(58) Field of Search ................................ 359/692, 691, 359/689, 690

(56) References Cited

U.S. PATENT DOCUMENTS 5,757,556 A * 5/1998 Nishimura .................. 359/692
6,384,986 B1 * 5/2002 Nishimura .................. 359/692

* cited by examiner

*Primary Examiner*—Georgia Epps
*Assistant Examiner*—M. Hasan
(74) *Attorney, Agent, or Firm*—Kenyon & Kenyon

(57) ABSTRACT

A variable magnification lens performs a magnification change by changing a distance between a first lens unit G1 having a positive refracting power and a second lens unit G2 having a negative refracting power, which are arranged in this order from the object side. The first lens unit G1 includes, in order from the object side, a sub-unit 1a, an aperture stop S, and a sub-unit 1b. All lens elements constituting the first lens unit G1 are arranged with intervening air spaces between one another. The variable magnification lens satisfies the following conditions:

$$1.1 < FL_w/IH < 1.35$$

$$0.80 < TL_t/FL_t < 0.94$$

where $FL_w$ is a focal length in a wide-angle end position, $FL_t$ is a focal length in a telephoto end position, IH is a maximum image height, and $TL_t$ is a distance, in the telephoto end position, from a first surface to an image surface along an optical axis.

35 Claims, 5 Drawing Sheets

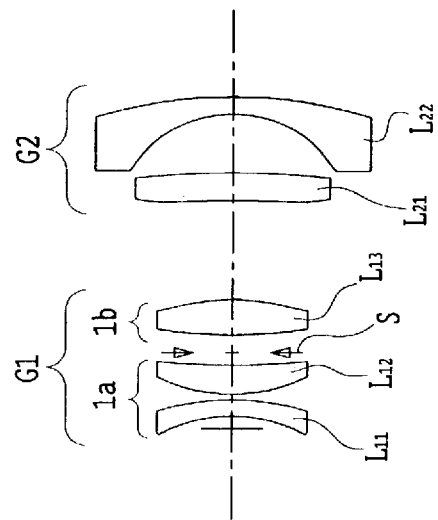
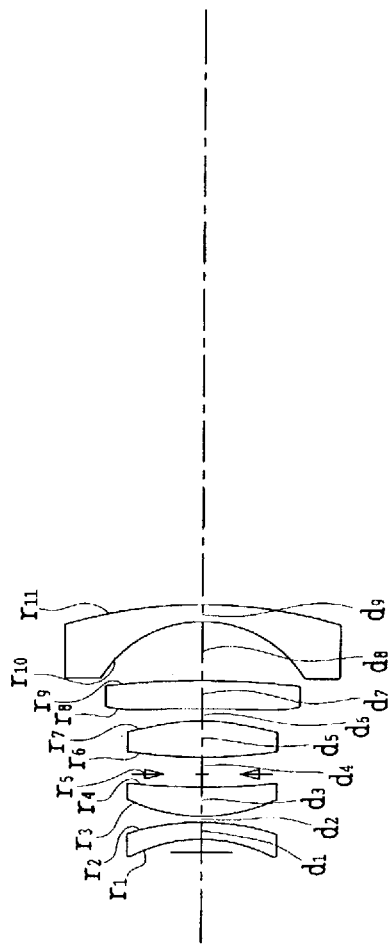
FIG. 1A
FIG. 1B

| FIG. 2A | FIG. 2B | FIG. 2C | FIG. 2D |
|---|---|---|---|
| SPHERICAL ABERRATION | ASTIGMATISM | DISTORTION | CHROMATIC ABERRATION OF MAGNIFICATION |
| $F_{no}=4.8$ | IH=21.63 | IH=21.63 | IH=21.63 |
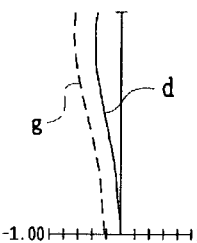  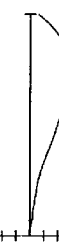 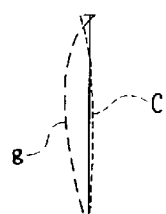
| FIG. 3A | FIG. 3B | FIG. 3C | FIG. 3D |
|---|---|---|---|
| $F_{no}=7.9$ | IH=21.63 | IH=21.63 | IH=21.63 |
   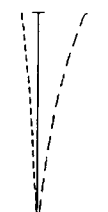
| FIG. 4A | FIG. 4B | FIG. 4C | FIG. 4D |
|---|---|---|---|
| $F_{no}=13.0$ | IH=21.63 | IH=21.63 | IH=21.63 |
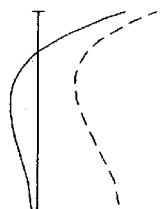 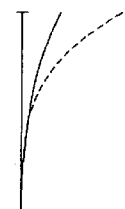  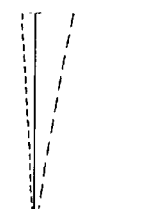

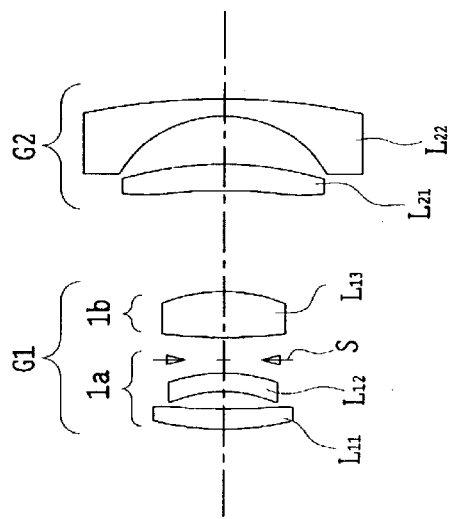
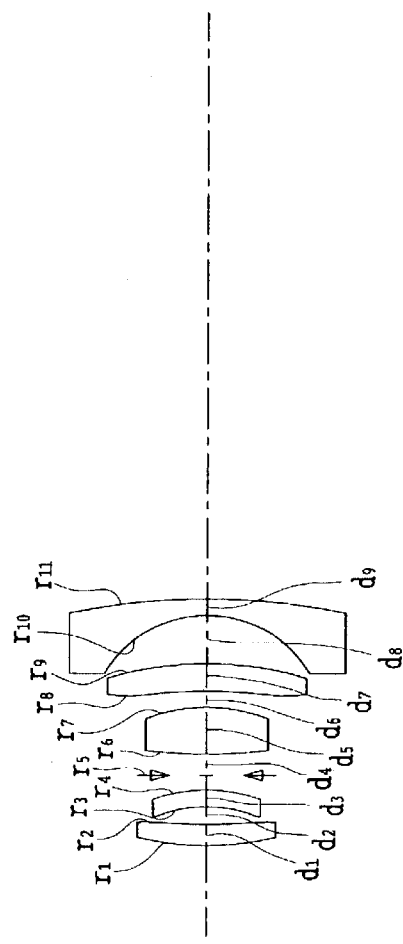
FIG. 5A
FIG. 5B

| FIG. 6A | FIG. 6B | FIG. 6C | FIG. 6D |
|---|---|---|---|
| SPHERICAL ABERRATION | ASTIGMATISM | DISTORTION | CHROMATIC ABERRATION OF MAGNIFICATION |
| Fno=4.6 | IH=21.63 | IH=21.63 | IH=21.63 |
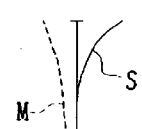
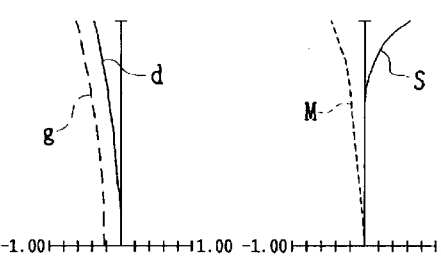
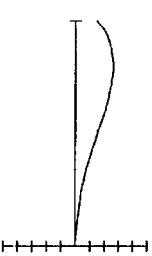
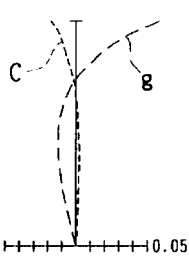
| FIG. 7A | FIG. 7B | FIG. 7C | FIG. 7D |
|---|---|---|---|
| Fno=7.6 | IH=21.63 | IH=21.63 | IH=21.63 |
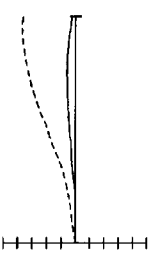
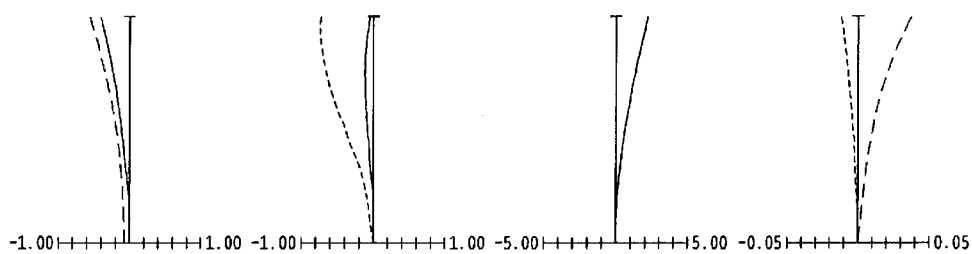
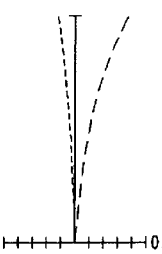
| FIG. 8A | FIG. 8B | FIG. 8C | FIG. 8D |
|---|---|---|---|
| Fno=12.5 | IH=21.63 | IH=21.63 | IH=21.63 |
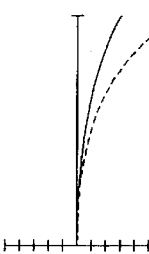
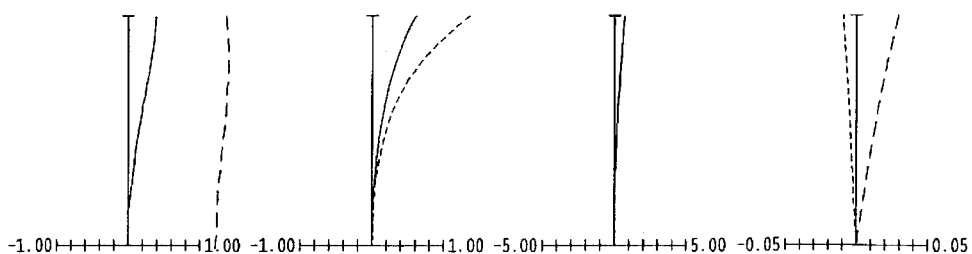
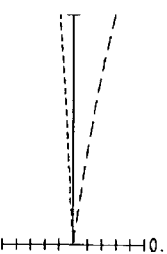

VARIABLE MAGNIFICATION LENS AND CAMERA HAVING THE SAME

BACKGROUND OF THE INVENTION

1) Field of the Invention

The present invention relates to a variable magnification lens, specifically to a small-sized, wide-angle variable magnification lens and a camera using the same.

2) Description of Related Art

A variable magnification lens of two-unit configuration that includes, in order from the object side, a positive front unit and a negative rear unit has often been used because of its simple structure. Also, in recent years, a requirement has grown to give a variable magnification lens for a compact camera a much smaller size and higher magnification ratio. In particular, a requirement for a wider field angle at the short-focal-length end in magnification change has grown. In addition, a further size reduction and cost reduction are required. For example, each of Japanese Patent Application Preliminary Publication (KOKAI) No. Sho 57-201213, Japanese Patent Application Preliminary Publication (KOKAI) No. Hei 2-6917, Japanese Patent Application Preliminary Publication (KOKAI) No. Hei 3-185412, Japanese Patent Application Preliminary Publication (KOKAI) No. Hei 10-96858, Japanese Patent Application Preliminary Publication (KOKAI) No. 2000-305015 and U.S. Pat. No. 5,493,448 proposes an inexpensive optical system composed of five or so lens elements in the entire system. Also, each of Japanese Patent Application Preliminary Publication (KOKAI) No. Hei 6-82696, Japanese Patent Application Preliminary Publication (KOKAI) No. Hei 6-160713, Japanese Patent Application Preliminary Publication (KOKAI) No. Hei 11-305123, Japanese Patent Application Preliminary Publication (KOKAI) No. 2001-194588, U.S. Pat. No. 5,270,867, and U.S. Pat. No. 5,900,991 proposes an optical system having a field angle wider than 70 degrees at the wide-angle end. Further, each of Japanese Patent Application Preliminary Publication (KOKAI) No. 2000-137163, Japanese Patent Application Preliminary Publication (KOKAI) No. 2001-116995, and U.S. Pat. No. 4,936,661 proposes a wide field-angle, high magnification-ratio optical system having a small number of components.

While each of above-cited JP KOKAI No. Sho 57-201213, JP KOKAI No. Hei 2-6917, JP KOKAI No. Hei 3-185412, JP KOKAI No. Hei 10-96858, JP KOKAI No. 2000-305015, and U.S. Pat. No. 5,493,448 proposes an optical system composed of five or so lens elements, such an optical system has a field angle narrower than 70 degrees and a variable magnification ratio smaller than 2.2. Also, according to each of JP KOKAI No. Hei 6-82696, JP KOKAI No. Hei 6-160713, JP KOKAI No. Hei 11-305123, JP KOKAI No. 2001-194588, U.S. Pat. No. 5,270,867, and U.S. Pat. No. 5,900,991, while the optical system achieves a wide field angle of 70 degrees or greater at the wide-angle end, its telephoto ratio at the telephoto end is as small as 1. In contrast, according to each of JP KOKAI No. 2000-137163, JP KOKAI No. 2001-116995, and the third and fourth embodiments of U.S. Pat. No. 4,936,661, the optical system achieves a wide field angle of 70 degrees or greater at the wide-angle end and a variable magnification ratio greater than 2.5 while keeping a telephoto ratio smaller than 0.96, and thus can be regarded as achieving a wide field angle, a high magnification ratio and a small size. However, in each of JP KOKAI No. 2000-137163, JP KOKAI No. 2001-116995 and the third and fourth embodiments of U.S. Pat. No. 4,936,661, the optical system is composed of six or more lens elements. In addition, according to U.S. Pat. No. 4,936,661, aspherical surfaces are applied to three lens elements.

SUMMARY OF THE INVENTION

According to the first aspect of the present invention, a variable magnification lens includes, in order from an object side, a first lens unit (front unit) having a positive refracting power and a second lens unit (rear unit) having a negative refracting power, a magnification change being performed by a change of a distance between the first lens unit and the second lens unit. In the variable magnification lens, the first lens unit consists of, in order from the object side, a sub-unit 1a that includes at least one lens element, an aperture stop, and a sub-unit 1b that includes at least one lens element, and all lens elements constituting the first lens unit are arranged with intervening air spaces between one another. The variable magnification lens satisfies the following conditions (1) and (2):

$$1.1 < FL_w/IH < 1.35 \qquad (1)$$

$$0.80 < TL_t/FL_t < 0.94 \qquad (2)$$

where $FL_w$ is a focal length in a wide-angle end position, $FL_t$ is a focal length in a telephoto end position, IH is a maximum image height, and $TL_t$ is a distance, in the telephoto end position, from a first surface to an image surface.

Also, according to the second aspect of the present invention, a variable magnification lens includes, in order from an object side, a first lens unit (front unit) having a positive refracting power and a second lens unit (rear unit) having a negative refracting power, a magnification change being performed by a change of a distance between the first lens unit and the second lens unit. In the variable magnification lens, the first lens unit consists of, in order from the object side, a sub-unit 1a that includes at least one lens element, an aperture stop, and a sub-unit 1b that includes at least one lens element, and all lens elements constituting the first lens unit are arranged with intervening air spaces between one another. The variable magnification lens satisfies the following conditions (1) and (3):

$$1.1 < FL_w/IH < 1.35 \qquad (1)$$

$$2.50 < FL_t/FL_w < 5.0 \qquad (3)$$

where $FL_w$ is a focal length in a wide-angle end position, $FL_t$ is a focal length in a telephoto end position, and IH is a maximum image height.

Also, according to the third aspect of the present invention, a variable magnification lens includes, in order from an object side, a first lens unit (front unit) having a positive refracting power and a second lens unit (rear unit) having a negative refracting power, a magnification change being performed by a change of a distance between the first lens unit and the second lens unit. In the variable magnification lens, the first lens unit consists essentially of a lens element having a negative refracting power and two lens elements having positive refracting powers, all the lens elements constituting the first lens unit being arranged with intervening air spaces between one another. The variable magnification lens satisfies the following conditions (1), (3), (4) and (5):

$$1.1 < FL_w/IH < 1.35 \qquad (1)$$

$$2.50 < FL_t/FL_w < 5.0 \qquad (3)$$

$$0.2 < Fb_w/FL_w < 0.37 \quad (4)$$

$$0.4 < FL_{1G}/FL_w < 0.7 \quad (5)$$

where $FL_w$ is a focal length in a wide-angle end position, $FL_t$ is a focal length in a telephoto end position, IH is a maximum image height, $Fb_w$ is a paraxial amount of a back focal distance in the wide-angle end position, and $FL_{1G}$ is a focal length of the first lens unit.

Also, a camera according to the present invention includes any one of the variable magnification lenses set forth above, a field stop that regulates the maximum image height IH formed by the variable magnification lens, and an optical finder that is configured separate from the variable magnification lens.

These and other features and advantages of the present invention will become apparent from the following detailed description of the preferred embodiments when taken in conjunction with the accompanying drawings.

BRIEF DESCRIPTION OF THE DRAWINGS

FIGS. 1A and 1B are sectional views, taken along the optical axis, of a variable magnification lens with a lens configuration according to the first embodiment of the present invention, showing the wide-angle end position and the telephoto end position, respectively.

FIGS. 2A, 2B, 2C and 2D are diagrams that show spherical aberration, astigmatism, distortion and chromatic aberration of magnification, respectively, in the wide-angle end position of the first embodiment according to the present invention.

FIGS. 3A, 3B, 3C and 3D are diagrams that show spherical aberration, astigmatism, distortion and chromatic aberration of magnification, respectively, in the intermediate position of the first embodiment according to the present invention.

FIGS. 4A, 4B, 4C and 4D are diagrams that show spherical aberration, astigmatism, distortion and chromatic aberration of magnification, respectively, in the telephoto end position of the first embodiment according to the present invention.

FIGS. 5A and 5B are sectional views, taken along the optical axis, of a variable magnification lens with a lens configuration according to the second embodiment of the present invention, showing the wide-angle end position and the telephoto end position, respectively.

FIGS. 6A, 6B, 6C and 6D are diagrams that show spherical aberration, astigmatism, distortion and chromatic aberration of magnification, respectively, in the wide-angle end position of the second embodiment according to the present invention.

FIGS. 7A, 7B, 7C and 7D are diagrams that show spherical aberration, astigmatism, distortion and chromatic aberration of magnification, respectively, in the intermediate position of the second embodiment according to the present invention.

FIGS. 8A, 8B, 8C and 8D are diagrams that show spherical aberration, astigmatism, distortion and chromatic aberration of magnification, respectively, in the telephoto end position of the second embodiment according to the present invention.

DETAILED DESCRIPTION OF THE PREFERRED EMBODIMENTS

Figure 9:
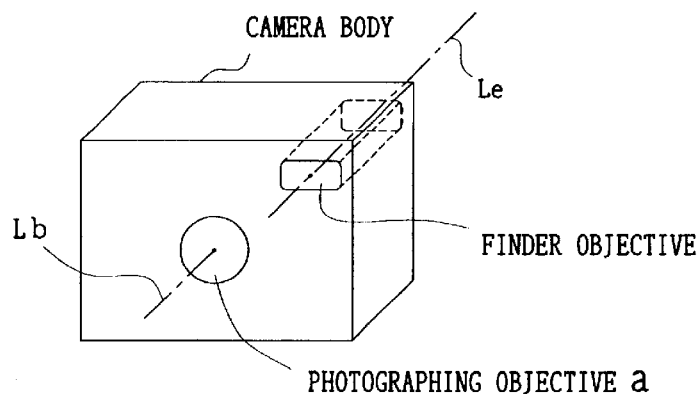
FIG. 9 is a schematic perspective view of an example of a camera using the variable magnification lens according to the present invention.

Preceding the description of the individual embodiments, the function and effect of the present invention are explained. The present invention relates to a variable magnification lens that includes a first lens unit having a negative refracting power and a second lens unit having a positive refracting power, a magnification change being performed by a change of a distance between the first lens unit and the second lens unit.

According to the first aspect of the present invention, the distance between the first lens unit and the second lens unit can be made short because of the stop arranged in the first lens unit. In addition, a diameter of a lens disposed on the object side of the stop is allowed to be smaller than in a case where the stop is disposed on the image side of the first lens unit. Since an axial thickness of a positive lens, a certain amount of which is necessitated in order to assure a certain rim thickness, and a sag at the rim of a concave surface can be made small, the total length of the entire lens system in the telephoto end position can be shortened. By constructing every lens element in the first lens unit as a singlet, a curvature of each lens surface can be made more moderate than in a case where a cemented lens is used. Consequently, a certain rim thickness of a lens element can be easily assured, as well as cost can be reduced by omission of a process of cementing lenses.

Also, according to the second aspect of the present invention, because of the stop arranged in the first lens unit, the ray height inside the first lens unit can be made lower than in a case where the stop is arranged on the image side of the first lens unit. Consequently, since generation of spherical aberration and coma can be reduced, it is easy to design a long focal length in the telephoto end position, where the aberrations at the first lens unit are amplified. Also, by constructing every lens element in the first lens unit as a singlet, a curvature of each lens surface can be made more moderate than in a case where a cemented lens is used, to reduce manufacturing cost of the lenses.

In designing an inexpensive optical system, it is desirable to make diameters of lenses small. According to the third aspect of the present invention, a back focal distance can be set long and accordingly a diameter of the rearmost lens, which has a large effect on the cost, can be reduced. Also, by composing the first lens unit of three singlets, reduction in number of lens elements and reduction in cost of parts can be achieved. If the upper limit value of Condition (4) is exceeded, the total length of the system becomes too long to achieve size reduction. On the other hand, if the lower limit value of Condition (4) is not reached, a lens diameter in the second lens unit becomes large, to increase the size of the entire system. In addition to Condition (4), Condition (5) also relates to size reduction of the system. If the upper limit value of Condition (5) is exceeded, an amount of movement of the first lens unit in a magnification change becomes large, to cause bulkiness of the entire system. If the lower limit value of Condition (5) is not reached, while an amount of movement is small, an enhanced refracting power makes it difficult to compensate for aberrations, and resultantly spoils good image quality.

Since it is desirable to reduce number of parts for the purpose of achieving size reduction and cost reduction, compensation for aberrations is performed by using aspherical surfaces. However, since a lens diameter in the second lens unit becomes large, if an aspherical surface lens made of glass is to be used there, it could be manufactured less efficiently, to prevent cost reduction. The variable magnification lens according to the present invention is characterized in that the second lens unit includes a plastic lens element having at least one aspherical surface and a glass lens element directing a concave surface thereof toward the object side. According to this configuration, a plastic lens formed by injection molding can be used and thus manufacturing becomes easy, to achieve cost reduction.

Also, the variable magnification lens according to the present invention is characterized by satisfying the following condition (6):

$$0 < FL_{1P}/FL_{2P} < 0.1 \qquad (6)$$

where $FL_{1P}$ is a focal length of a most image-side positive lens element in the first lens unit and $FL_{2P}$ is a focal length of a most object-side positive lens element in the second lens element.

In a configuration where Condition (6) is specified, an aspherical surface is used in the second lens unit on the object side thereof for the purpose of improving optical performance. In this case, use of a plastic lens is preferable in view of cost because a lens diameter in the second lens unit is relatively large. However, since a plastic lens shows a large fluctuation depending on temperature and humidity, it is desirable to give the plastic lens element a refracting power that satisfies Condition (6). By satisfying Condition (6), it is possible to provide a small-diameter, plastic lens element that suppresses a height of rays from the first lens unit. If the upper limit value of Condition (6) is exceeded, a refracting power of the plastic lens element in the second lens unit becomes so large that fluctuation of picturing performance depending on the ambience becomes large. If the lower limit value of Condition (6) is not reached, the plastic lens element has a negative refracting power and thus coma in the second lens unit that is caused by decentering substantially fluctuates. Therefore, picturing performance is liable to deterioration.

Also, the variable magnification lens according to the present invention is characterized in that the sub-unit 1a consists of a meniscus lens element having a negative refracting power and a meniscus lens element having a positive refracting power, the meniscus lens elements being arranged so that convex surfaces thereof face one another or concave surfaces thereof face one another. In this configuration, negative astigmatisms generated in the second lens unit and the sub-unit 1b are compensated for by the negative lens of the sub-unit 1a and distortions generated in the sub-unit 1a cancel inside the sub-unit. In this way, the off-axial aberrations can be compensated for in good condition.

Also, the variable magnification lens according to the present invention is characterized in that every lens element in the first lens unit is constructed as a glass lens element. In a case where a plastic lens element is used, since fluctuation of its refracting power depending on temperature and humidity is large, an extremely strong refracting power would cause unstableness of the in-focus position or picturing performance. In addition, the lens element is required to have a certain thickness for stableness of the mold. Resultantly, a thick lens having a weak refracting power is disposed in the path, to prevent the entire system from length reduction. In contrast, in a case a glass lens element is used, since glass is less susceptible to temperature and humidity, the lens element is able to have high stability. In particular, since the performance of the first lens unit is magnified by the second lens unit in a magnification change, it is desirable to construct lenses in the first lens unit as glass lenses. Also, according to the present invention, it is desirable, in view of cost and manufacturing efficiency, to compose the first lens unit of tree lens elements and the second lens unit of two or so lens elements.

Also, in the variable magnification lens according to the present invention, the first lens unit and the second lens unit alone are movable in a magnification change. In addition, only the first lens unit and the second lens unit have refracting powers.

Now, further explanation is made regarding the upper limit value and the lower limit value of each of Conditions (1)–(6). If the upper limit value of Condition (1) is exceeded, the field angle in the wide-angle end position becomes too narrow to be entitled "wide angle". On the other hand, if the field angle is so wide that the lower limit value fails to be reached, a refracting power of each lens unit is required to be large, and accordingly aberrations generated at each lens unit become large, to cause difficulty in compensation for aberrations over the variable magnification range. Also, the lower limit value of Condition (1) may be changed to 1.25. Whereby, the field angle in the wide-angle end position is appropriately moderated and thus compensation for aberrations can be performed in good condition with a small number of lens elements. Also, the upper limit value of Condition (1) may be changed to 1.34. Whereby, in a case where the lens configuration of the present invention is employed, a shortened entire lens length and an appropriate field angle are assured on the wide-angle side while keeping a good balance with compensation for aberrations.

If the lower limit value of Condition (2) is not reached, a refracting power of each lens unit is much enhanced. Therefore, while the entire lens length in the telephoto end position is shortened, aberrations generated at each lens unit become large, to cause difficulty in compensation for aberrations over the variable magnification range. If the upper limit value of Condition (2) is exceeded, the entire lens length becomes long, to cause difficulty in size reduction of a camera. Also, the lower limit value of Condition (2) may be changed to 0.85. Whereby, compensation for aberrations can be performed in good condition with a small number of lens elements.

If the lower limit value of Condition (3) is not reached, the focal length in the telephoto end position is shortened and accordingly the market value of the camera is lowered. If the upper limit value of Condition (3) is exceeded, aberrations generated at each lens unit become large, to cause difficulty in compensation for aberrations over the variable magnification range. Also, the lower limit value of Condition (3) may be changed to 2.6 or further to 2.65. Whereby, in a case where the lens configuration according to the present invention is employed, an appropriate variable magnification ratio can be assured. Also, the upper limit value of Condition (3) may be changed to 3.0. Whereby, compensation for aberrations can be performed in good condition with a small number of lens elements.

The lower limit value of Condition (4) may be changed to 0.23. Also, the upper limit value of Condition (4) may be changed to 0.30. Whereby, increase in entire lens length and increase in diameter of the second lens unit can be limited more stringently.

The lower limit value of condition (5) may be changed to 0.50. Whereby, an amount of movement of the first lens unit can be made small, to further improve aberration performance.

The lower limit value of Condition (6) may be changed to 0.02. In a case where the second lens unit is composed of a small number (two, for example) of lens elements, it is much preferred that an appropriate refracting power is given to the most object-side positive lens element in the second lens unit having a negative refracting power. Therefore, it is much preferable to change the lower limit value of Condition (6) to 0.02. The upper limit value of Condition (6) may be changed to 0.07. Whereby, the most object-side positive lens element in the second lens unit is much less affected by temperature change or humidity change.

The embodiments of the present invention are described below in reference to the drawings and numerical data.

First Embodiment

As shown in FIGS. 1A and 1B, the variable magnification lens according to the first embodiment of the present invention includes, in order from the object side, a first lens unit (front unit) G1 having a positive refracting power and a second lens unit (rear unit) G2 having a negative refracting power, and performs a magnification change by changing a distance between the first lens unit G1 and the second lens unit G2. Specifically, in the magnification change from the wide-angle end through the telephoto end, both lens units are moved toward the object side while narrowing the distance between them. The first lens unit (front unit) G1 includes, in order from the object side, a sub-unit 1a that includes a negative meniscus lens element $L_{11}$ directing a convex surface thereof toward the image side and a positive meniscus lens element $L_{12}$ directing a convex surface thereof toward the object side, a stop S, and a sub-unit 1b that includes a positive aspherical surface lens element $L_{13}$. The second lens unit (rear unit) G2 includes, in order from the object side, a positive meniscus lens element $L_{21}$ and a negative meniscus lens element $L_{21}$. The most image-side surface of the first lens unit, or the seventh surface $r_7$ and the most object-side surface of the second lens unit, or the eighth surface $r_8$ are constructed as aspherical surfaces.

Aberration performance of the first embodiment is shown in FIGS. 2A–2D, 3A–3D, and 4A–4D. In the diagrams, g, d, and C represent g-line (wavelength 435.8 nm), d-line (wavelength 587.6 nm), and C-line (wavelength 656.3 nm), respectively. S and M represent a sagittal image and a meridional image, respectively.

Numerical data of the optical members according to the first embodiment are presented below. In the data, $r_m$ (m=1, 2, . . . ) represents a radius of curvature of each lens surface, $d_m$ (m=1, 2, . . . ) is a thickness of each lens or an air space, $n_m$ (m=1, 2, . . . ) is a refractive index of each lens for d-line rays, F is a focal length of the variable magnification lens as a whole system, $v_m$ (m=1, 2, . . . ) is an Abbe's number of each lens for d-line rays, Fno is an F-number, D1 is a variable distance between the seventh surface and the eighth surface, Fb is a back focal distance (the distance from the eleventh surface $r_{11}$ to the image surface).

A shape of an aspherical surface is expressed by the following equation upon defining x axis along an optical axis with a light-traveling direction being taken as a positive direction and taking a value of y in reference to the optical axis along a direction perpendicular to the optical axis:

$$x=(y^2/r)/[1+\{1-(K+1)\cdot(y/r)^2\}^{1/2}]+AC_4\cdot y^4+AC_6\cdot y^6+AC_8\cdot y^8+AC_{10}\cdot y^{10}$$

where r is a radius of paraxial curvature, K is a conical coefficient, $AC_4$, $AC_6$, $AC_8$, and $AC_{10}$ are fourth-order, sixth-order, eighth-order, and tenth-order aspherical coefficients, respectively.

It is noted that these symbols used for the first embodiment in the aberration diagrams 2A–2D, 3A–3D and 4A–4c and in the lens data tables 1a, 1b and 1c below are commonly used for the second embodiment described later.

TABLE 1a

F = 28.8–47.3–77.6, Fno = 4.8–7.9–13.0

| Surface No. = m | Radius of Curvature = $R_m$ | Space = $d_m$ | Refractive Index = $n_m$ | Abbe's Number = $v_m$ | Vitreous Substance |
|---|---|---|---|---|---|
| 1 | −12.3730 | 1.400 | 1.84666 | 23.78 | glass |
| 2 | −22.5163 | 0.500 | 1. | | |
| 3 | 14.5794 | 2.300 | 1.57501 | 41.50 | glass |
| 4 | 48.1505 | 1.072 | 1. | | |
| 5 | stop | 1.500 | 1. | | |
| 6 | 40.7368 | 3.000 | 1.58313 | 59.46 | glass |
| 7 | −16.6662 | D1 | 1. | | |
| 8 | −99.8290 | 2.300 | 1.58423 | 30.49 | plastic |
| 9 | −83.3333 | 5.083 | 1. | | |
| 10 | −9.6000 | 1.450 | 1.77250 | 49.60 | glass |
| 11 | −39.4624 | Fb | 1. | | |

TABLE 1b

Aspherical surface

| Surface No. | K | $AC_4$ | $AC_6$ | $AC_8$ | $AC_{10}$ |
|---|---|---|---|---|---|
| 7 | 0 | $1.0722 \times 10^{-4}$ | $2.7052 \times 10^{-6}$ | $-2.1292 \times 10^{-8}$ | $-2.7466 \times 10^{-11}$ |
| 8 | 0 | $6.0721 \times 10^{-5}$ | $1.2030 \times 10^{-6}$ | $-1.3046 \times 10^{-8}$ | $1.3242 \times 10^{-10}$ |

TABLE 1c

Variable distance

| | | | |
|---|---|---|---|
| Focal Length (mm) | 28.8 | 47.3 | 77.6 |
| D1 | 8.197 | 3.666 | 0.910 |
| Fb | 6.948 | 23.116 | 49.598 |

Second Embodiment

As shown in FIGS. 5A and 5B, the variable magnification lens according to the second embodiment of the present invention includes, in order from the object side, a first lens unit G1 having a positive refracting power and a second lens unit G2 having a negative refracting power. The first lens unit G1 includes, in order from the object side, a sub-unit 1a that includes a positive meniscus lens element $L_{11}$ directing a concave surface thereof toward the image side and a negative meniscus lens element $L_{12}$ directing a concave surface thereof toward the object side, a stop S, and a sub-unit 1b that includes a positive aspherical surface lens element $L_{13}$. The second lens unit G2 includes, in order from the object side, a positive meniscus lens element $L_{21}$ and a negative meniscus lens element $L_{21}$. The most image-side surface of the first lens unit G1, or the seventh surface $r_7$ and the most object-side surface of the second lens unit G2, or the eighth surface $r_8$ are constructed as aspherical surfaces. The variable magnification lens according to the second embodiment also performs a magnification change by changing a distance between the first lens unit G1 and the second lens unit G2. Specifically, in the magnification change from the wide-angle end through the telephoto end, the first lens unit (front unit) G1 and the second lens unit (rear unit) G2 are moved toward the object side while narrowing the distance between them.

Aberration performance of the second embodiment is shown in FIGS. 6A–6D, 7A–7D, and 8A–8D. Lens data of the second embodiment are shown in tables 2a, 2b and 2c below.

TABLE 2a

F = 28.8–47.3–77.6, Fno = 4.6–7.6–12.5

| Surface No. = m | Radius of Curvature = $r_m$ | Space = $d_m$ | Refractive Index = $n_m$ | Abbe's Number = $v_m$ | Vitreous Substance |
|---|---|---|---|---|---|
| 1 | 22.0124 | 1.861 | 1.48749 | 70.23 | glass |
| 2 | 53.5179 | 1.576 | 1. | | |
| 3 | −10.7196 | 1.500 | 1.84666 | 23.78 | glass |
| 4 | −15.7697 | 1.200 | 1. | | |
| 5 | stop | 1.823 | 1. | | |
| 6 | 41.2692 | 4.000 | 1.58313 | 59.46 | glass |
| 7 | −12.9776 | D1 | 1. | | |
| 8 | −39.9742 | 2.300 | 1.52542 | 55.78 | plastic |
| 9 | −32.0713 | 4.200 | 1. | | |
| 10 | −9.9500 | 1.450 | 1.74100 | 52.64 | glass |
| 11 | −61.2523 | Fb | 1. | | |

TABLE 2b

Aspherical surface

| Surface Number | K | $AC_4$ | $AC_6$ | $AC_8$ | $AC_{10}$ |
|---|---|---|---|---|---|
| 7 | −0.916 | $4.0349 \times 10^{-5}$ | $2.5518 \times 10^{-8}$ | $8.4074 \times 10^{-10}$ | 0 |
| 8 | 0 | $8.9817 \times 10^{-5}$ | $4.9991 \times 10^{-7}$ | $2.3762 \times 10^{-9}$ | 0 |

TABLE 2c

Variable distance

| focal length (mm) | 28.8 | 47.3 | 77.6 |
|---|---|---|---|
| D1 | 8.528 | 4.039 | 1.310 |
| Fb | 7.322 | 23.729 | 50.602 |

Values regarding the numerical conditions in the first embodiment and the second embodiments are shown in Table 3 below.

TABLE 3

| | Condition (1) | Condition (2) | Condition (3) | Condition (4) | Condition (5) | Condition (6) |
|---|---|---|---|---|---|---|
| First Embodiment | 1.33 | 2.69 | 0.24 | 0.68 | 0.025 | 0.025 |

TABLE 3-continued

| | Condition (1) | Condition (2) | Condition (3) | Condition (4) | Condition (5) | Condition (6) |
|---|---|---|---|---|---|---|
| Second Embodiment | 1.33 | 2.69 | 0.25 | 0.59 | 0.062 | 0.062 |

Figure 10:
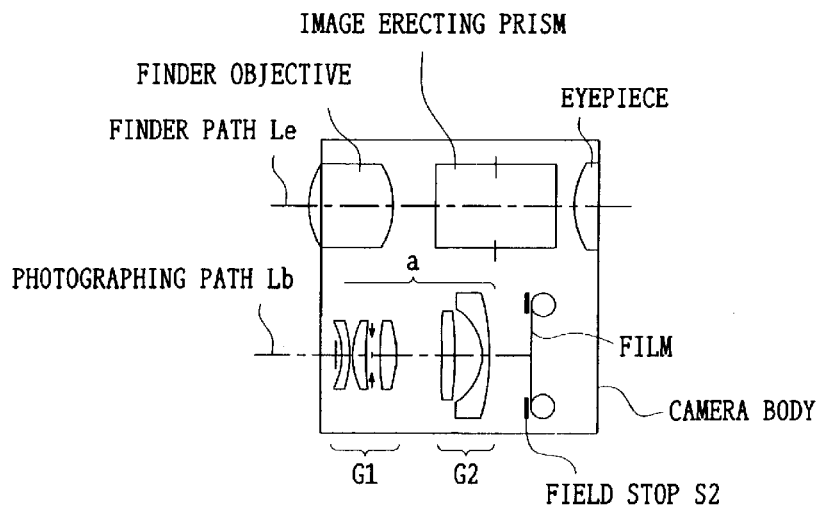
FIG. 10 is a sectional view of FIG. 9 camera showing the schematic configuration inside the camera.
Figure 11:
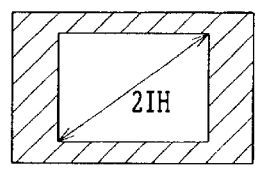
FIG. 11 is an explanatory view that shows a diagonal length of a frame in the camera shown in FIG. 9.

Here, in reference to FIGS. 9–11, description is made of a camera provided with the above-described variable magnification lens according to the present invention. The camera according to the present invention is used as a compact camera provided with a photographing objective a, which has a configuration as illustrated. In the example shown in FIG. 10, a variable magnification lens as described in the first embodiment is featured, where G1 corresponds to the first lens unit having a positive refracting power and G2 corresponds to the second lens unit having a negative refracting power. Also, Lb represents a photographing path and Le represents a finder path. The photographing path Lb and the finder path Le are arranged in parallel. While being viewed via a finder, which includes a finder objective, an image erecting prism, a stop, and an eyepiece, an image of the object is formed on a film by the photographing objective a. Here, a field stop S2 is disposed immediately before the film. As shown in FIG. 11, the field stop S2 has a rectangular opening to regulate the photographing field. The diagonal length of the field stop corresponds to 2IH, or twice the image height.

Also, the variable magnification lens according to the present invention can be used as a photographing objective of a compact electronic camera, which uses an electronic image pickup element such as a CCD in place of a film. In this case, a positive lens may be arranged immediately before the image-pickup surface of the electronic image pickup element so that axial and off-axial chief rays are incident on the electronic image pickup element substantially perpendicular thereto. In this application, the diagonal length of the maximum effective photographing region of the electronic image pickup element corresponds to 2IH.

What is claimed is:

1. A variable magnification lens comprising, in order from an object side:
   a first lens unit having a positive refracting power; and
   a second lens unit having a negative refracting power,
   a magnification change being performed by a change of a distance between the first lens unit and the second lens unit,
   wherein the first lens unit consists of, in order from the object side:
      a sub-unit (1a) comprising at least one lens element;
      an aperture stop; and
      a sub-unit (1b) comprising at least one lens element,
   wherein all lens elements constituting the first lens unit are arranged with intervening air spaces between one another, and wherein the variable magnification lens satisfies the following conditions:

$1.1 < FL_w/IH < 1.35$ $0.80 < TL_t/FL_t < 0.94$ where $FL_w$ is a focal length in a wide-angle end position, $FL_t$ is a focal length in a telephoto end position, IH is a maximum image height, and $TL_t$ is a distance, in the telephoto end position, from a first surface to an image surface along an optical axis.

2. A variable magnification lens comprising, in order from an object side:
- a first lens unit having a positive refracting power; and
- a second lens unit having a negative refracting power,
- a magnification change being performed by a change of a distance between the first lens unit and the second lens unit,
- wherein the first lens unit consists of, in order from the object side:
  - a sub-unit (1a) comprising at least one lens element;
  - an aperture stop; and
  - a sub-unit (1b) comprising at least one lens element,
- wherein all lens elements constituting the first lens unit are arranged with intervening air spaces between one another, and
- wherein the variable magnification lens satisfies the following conditions:

$1.1 < FL_w/IH < 1.35$ $2.50 < FL_t/FL_w < 5.0$ where $FL_w$ is a focal length in a wide-angle end position, $FL_t$ is a focal length in a telephoto end position, and IH is a maximum image height.

3. A variable magnification lens comprising, in order from an object side:
- a first lens unit having a positive refracting power; and
- a second lens unit having a negative refracting power,
- a magnification change being performed by a change of a distance between the first lens unit and the second lens unit,
- wherein the first lens unit consists essentially of:
  - a lens element having a negative refracting power; and
  - two lens elements each having a positive refracting power,
- wherein all the lens elements constituting the first lens unit are arranged with intervening air spaces between one another, and
- wherein the variable magnification lens satisfies the following conditions:

$1.1 < FL_w/IH < 1.35$ $2.50 < FL_t/FL_w < 5.0$ $0.2 < Fb_w/FL_w < 0.37$ $0.4 < FL_{1G}/FL_w < 0.7$ where $FL_w$ is a focal length in a wide-angle end position, $FL_t$ is a focal length in a telephoto end position, IH is a maximum image height, $Fb_w$ is a paraxial amount of a back focal distance in the wide-angle end position, and $FL_{1G}$ is a focal length of the first lens unit.

4. A camera comprising:
- a variable magnification lens according to claim 1, the variable magnification lens being used as a photographing lens;
- a field stop that regulates the maximum image height formed by the variable magnification lens; and
- an optical finder that is configured separate from the variable magnification lens and that gives a view of a photographing field of the variable magnification lens.

5. A camera comprising:
- a variable magnification lens according to claim 2, the variable magnification lens being used as a photographing lens;
- a field stop that regulates the maximum image height formed by the variable magnification lens; and
- an optical finder that is configured separate from the variable magnification lens and that gives a view of a photographing field of the variable magnification lens.

6. A camera comprising:
- a variable magnification lens according to claim 3, the variable magnification lens being used as a photographing lens;
- a field stop that regulates the maximum image height formed by the variable magnification lens; and
- an optical finder that is configured separate from the variable magnification lens and that gives a view of a photographing field of the variable magnification lens.

7. A variable magnification lens according to claim 1, wherein the second lens unit comprises a plastic lens element having at least one aspherical surface and a glass lens element directing a concave surface thereof toward the object side.

8. A variable magnification lens according to claim 1, satisfying the following condition:

$0 < FL_{1P}/FL_{2P} < 0.1$ where $FL_{1P}$ is a focal length of a most image-side positive lens element in the first lens unit, and $FL_{2P}$ is a focal length of a most object-side positive lens element in the second lens unit.

9. A variable magnification lens according to claim 1, wherein the sub-unit (1a) consists of a meniscus lens element having a negative refracting power and a meniscus lens element having a positive refracting power, the meniscus lens elements being arranged so that convex surfaces thereof face one another or concave surfaces thereof face one another.

10. A variable magnification lens according to claim 1, wherein every lens element in the first lens unit is constructed as a glass lens element.

11. A variable magnification lens according to claim 1, wherein the first lens unit consists of, in order from the object side, a negative meniscus lens element directing a convex surface thereof toward an image side, a positive meniscus lens element directing a convex surface thereof toward the object side, a stop, and a positive lens element having an aspherical surface.

12. A variable magnification lens according to claim 1, wherein the second lens unit consists of, in order from the object side, a positive meniscus plastic lens element directing a convex surface thereof toward an image side and a negative meniscus glass lens element directing a convex surface thereof toward the image side, at least an object-side surface of the positive meniscus plastic lens element being formed as an aspherical surface.

13. A variable magnification lens according to claim 1, wherein the first lens unit consists of, in order from the object side, a positive meniscus lens element directing a concave surface thereof toward an image side, a negative meniscus lens element directing a concave surface thereof toward the object side, a stop, and a positive lens element having an aspherical surface.

14. A variable magnification lens according to claim 1, wherein the second lens unit consists of, in order from the object side, a positive meniscus plastic lens element directing a convex surface thereof toward an image side and a negative meniscus glass lens element directing a convex surface thereof toward the image side, only one of surfaces of the positive meniscus plastic lens element being formed as an aspherical surface.

15. A variable magnification lens according to claim 1, wherein the first lens unit and the second lens unit alone are movable in the magnification change.

16. A variable magnification lens according to claim 1, wherein only the first lens unit and the second lens unit have refracting powers.

17. A variable magnification lens according to claim 2, wherein the second lens unit comprises a plastic lens element having at least one aspherical surface and a glass lens element directing a concave surface thereof toward the object side.

18. A variable magnification lens according to claim 2, satisfying the following condition:

$$0 < FL_{1P}/FL_{2P} < 0.1$$

where $FL_{1P}$ is a focal length of a most image-side positive lens element in the first lens unit, and $FL_{2P}$ is a focal length of a most object-side positive lens element in the second lens unit.

19. A variable magnification lens according to claim 2, wherein the sub-unit (1a) consists of a meniscus lens element having a negative refracting power and a meniscus lens element having a positive refracting power, the meniscus lens elements being arranged so that convex surfaces thereof face one another or concave surfaces thereof face one another.

20. A variable magnification lens according to claim 2, wherein every lens element in the first lens unit is constructed as a glass lens element.

21. A variable magnification lens according to claim 2, wherein the first lens unit consists of, in order from the object side, a negative meniscus lens element directing a convex surface thereof toward an image side, a positive meniscus lens element directing a convex surface thereof toward the object side, a stop, and a positive lens element having an aspherical surface.

22. A variable magnification lens according to claim 2, wherein the second lens unit consists of, in order from the object side, a positive meniscus plastic lens element directing a convex surface thereof toward an image side and a negative meniscus glass lens element directing a convex surface thereof toward the image side, at least an object-side surface of the positive meniscus plastic lens element being formed as an aspherical surface.

23. A variable magnification lens according to claim 2, wherein the first lens unit consists of, in order from the object side, a positive meniscus lens element directing a concave surface thereof toward an image side, a negative meniscus lens element directing a concave surface thereof toward the object side, a stop, and a positive lens element having an aspherical surface.

24. A variable magnification lens according to claim 2, wherein the second lens unit consists of, in order from the object side, a positive meniscus plastic lens element directing a convex surface thereof toward an image side and a negative meniscus glass lens element directing a convex surface thereof toward the image side, only one of surfaces of the positive meniscus plastic lens element being formed as an aspherical surface.

25. A variable magnification lens according to claim 2, wherein the first lens unit and the second lens unit alone are movable in the magnification change.

26. A variable magnification lens according to claim 2, wherein only the first lens unit and the second lens unit have refracting powers.

27. A variable magnification lens according to claim 3, wherein the second lens unit comprises a plastic lens element having at least one aspherical surface and a glass lens element directing a concave surface thereof toward the object side.

28. A variable magnification lens according to claim 3, satisfying the following condition:

$$0 < FL_{1P}/FL_{2P} < 0.1$$

where $FL_{1P}$ is a focal length of a most image-side positive lens element in the first lens unit, and $FL_{2P}$ is a focal length of a most object-side positive lens element in the second lens unit.

29. A variable magnification lens according to claim 3, wherein every lens element in the first lens unit is constructed as a glass lens element.

30. A variable magnification lens according to claim 3, wherein the first lens unit consists of, in order from the object side, a negative meniscus lens element directing a convex surface thereof toward an image side, a positive meniscus lens element directing a convex surface thereof toward the object side, a stop, and a positive lens element having an aspherical surface.

31. A variable magnification lens according to claim 3, wherein the second lens unit consists of, in order from the object side, a positive meniscus plastic lens element directing a convex surface thereof toward an image side and a negative meniscus glass lens element directing a convex surface thereof toward the image side, at least an object-side surface of the positive meniscus plastic lens element being formed as an aspherical surface.

32. A variable magnification lens according to claim 3, wherein the first lens unit consists of, in order from the object side, a positive meniscus lens element directing a concave surface thereof toward an image side, a negative meniscus lens element directing a concave surface thereof toward the object side, a stop, and a positive lens element having an aspherical surface.

33. A variable magnification lens according to claim 3, wherein the second lens unit consists of, in order from the object side, a positive meniscus plastic lens element directing a convex surface thereof toward an image side and a negative meniscus glass lens element directing a convex surface thereof toward the image side, only one of surfaces of the positive meniscus plastic lens element being formed as an aspherical surface.

34. A variable magnification lens according to claim 3, wherein the first lens unit and the second lens unit alone are movable in the magnification change.

35. A variable magnification lens according to claim 3, wherein only the first lens unit and the second lens unit have refracting powers.

* * * * *